United States Patent
Goel et al.

(10) Patent No.: US 10,185,587 B2
(45) Date of Patent: Jan. 22, 2019

(54) WAIT-FREE PROCESS REQUEST EXECUTION UTILIZING A DEDICATED HELPER THREAD

(71) Applicant: International Business Machines Corporation, Armonk, NY (US)

(72) Inventors: Seep Goel, New Delhi (IN); Mudit Verma, Roorkee (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 15/286,984

(22) Filed: Oct. 6, 2016

(65) Prior Publication Data

US 2018/0101382 A1 Apr. 12, 2018

(51) Int. Cl.
*G06F 9/46* (2006.01)
*G06F 9/48* (2006.01)

(52) U.S. Cl.
CPC ............... *G06F 9/46* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 9,250,979 B2 | 2/2016 | McKenney | |
| 2002/0156897 A1* | 10/2002 | Chintalapati | H04L 29/06 709/227 |
| 2011/0167231 A1 | 7/2011 | Moir et al. | |

OTHER PUBLICATIONS

Verma, Mudit, "Scalable and Performance-Critical Data Structures for Multicores", Thesis Paper, Jun. 2013, 81 pages, Tecnico Lisboa.

Timnat, Shahar et al., "Wait-Free Linked-Lists", PPoPP'12, Feb. 25-29, 2012, New Orleans, Louisiana, USA, 2 pages, ACM Digital Library.

Herlihy, Maurice, "A Methodology for Implementing Highly Concurrent Data Objects", ACM Transactions on Programming Languages and Systems, Nov. 1993, 26 pages, vol. 15, No. 5, ACM Digital Library.

Fatourou, Panagiota et al., "A Highly-Efficient Wait-Free Universal Construction", SPAA'11, Jun. 4-6, 2011, San Jose, CA, USA, 10 pages, ACM Digital Library.

(Continued)

*Primary Examiner* — Wissam Rashid (74) *Attorney, Agent, or Firm* — Ference & Associates LLC (57) ABSTRACT

One embodiment provides a method, including: utilizing at least one processor to execute computer code that performs the steps of: receiving a system instruction from the at least one processor to perform an operation on a data structure; collecting, using at least one worker thread from a plurality of worker threads, a process request associated with the system instruction, wherein the plurality of worker threads perform operations within a computer system; placing the collected process request at a predetermined position on a state array, wherein the predetermined position is assigned to the at least one worker thread and wherein a helper thread is dedicated to the state array to execute requests placed within the state array; and executing the process request. Other aspects are described and claimed.

16 Claims, 4 Drawing Sheets

(56) References Cited

OTHER PUBLICATIONS

Hendler, Danny et al., "Flat Combining and the Synchronization-Parallelism Tradeoff", SPAA'10, Jun. 13-15, 2010, Thira, Santorini, Greece, 10 pages, ACM Digital Library.
Kogan, Alex et al., "A Methodology for Creating Fast Wait-Free Data Structures", PPoPP'12, Feb. 25-29, 2012, New Orleans, Louisiana, USA, 10 pages, ACM Digital Library.
Calciu, Irina et al., "Using Elimination and Delegation to Implement a Scalable NUMA-Friendly Stack", 5th USENIX Workshop on Hot Topics in Parallelism, Jun. 24-28, 2013, San Jose, CA, USA, 8 pages, ACM Digital Library.

\* cited by examiner

WAIT-FREE PROCESS REQUEST EXECUTION UTILIZING A DEDICATED HELPER THREAD

BACKGROUND

Many computing systems (e.g., personal computers, servers, networked computers, etc.) include multicore processors. Multicore processors contain two or more independent processing units, i.e., "cores," which read and execute program instructions. Systems with multicore processors are able to perform more operations simultaneously due to the parallel computing functionality afforded by the multicore processors. In some multicore processing systems, each of the processing units can access the main-system memory in addition to memory local to each of the processing units. Additionally, the processing units may also be able to access non-local memory. Non-local memory may include memory that is local to another processor or memory that is shared between processors, for example, the main-system memory. In some multicore processing systems, the access time for a single processor to access different memory (e.g., local, non-local, etc.) is different and can add significant time to the execution of processes. The increase in memory access time may become a problem for performance-critical software.

BRIEF SUMMARY

In summary, one aspect of the invention provides a method, comprising: utilizing at least one processor to execute computer code that performs the steps of: receiving a system instruction from the at least one processor to perform an operation on a data structure; collecting, using at least one worker thread from a plurality of worker threads, a process request associated with the system instruction, wherein the plurality of worker threads perform operations within a computer system; placing the collected process request at a predetermined position on a state array, wherein the predetermined position is assigned to the at least one worker thread and wherein a helper thread is dedicated to the state array to execute requests placed within the state array; and executing the process request.

Another aspect of the invention provides an apparatus, comprising: at least one processor; and a computer readable storage medium having computer readable program code embodied therewith and executable by the at least one processor, the computer readable program code comprising: computer readable program code that receives a system instruction from the at least one processor to perform an operation on a data structure; computer readable program code that collects, using at least one worker thread from a plurality of worker threads, a process request associated with the system instruction, wherein the plurality of worker threads perform operations within a computer system; computer readable program code that places the collected process request at a predetermined position on a state array, wherein the predetermined position is assigned to the at least one worker thread and wherein a helper thread is dedicated to the state array to execute requests placed within the state array; and computer readable program code that executes the process request.

An additional aspect of the invention provides a computer program product, comprising: a computer readable storage medium having computer readable program code embodied therewith, the computer readable program code executable by at least one processor and comprising: computer readable program code that receives a system instruction from the at least one processor to perform an operation on a data structure; computer readable program code that collects, using at least one worker thread from a plurality of worker threads, a process request associated with the system instruction, wherein the plurality of worker threads perform operations within a computer system; computer readable program code that places the collected process request at a predetermined position on a state array, wherein the predetermined position is assigned to the at least one worker thread and wherein a helper thread is dedicated to the state array to execute requests placed within the state array; and computer readable program code that executes the process request.

A further aspect of the invention provides a method, comprising: utilizing at least one processor to execute computer code that performs the steps of: receiving a system instruction from the at least one processor, wherein the system instruction comprises a plurality of process requests for completing an operation on a data structure; assigning, to each worker thread from a plurality of worker threads created to collect process requests, a position of a state array, wherein the state array has a dedicated helper thread that is assigned to execute process requests placed within the state array; collecting, using one of the worker threads, at least one of the plurality of process requests and placing the process request at the position of the state array assigned to the one of the worker threads; and executing the process requests placed on the state array, wherein the process requests are executed by the dedicated helper thread while located on the state array.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

As advances in technology are made, multicore machines are becoming larger and more capable of utilizing an increasing number of processors that can execute a greater number of operations. However, performance-critical software may be unable to take full advantage of the parallel processors due to high contention amongst threads/processes accessing a shared data structure under heavy load patterns. Thus, the inclusion of the multiple threads/processes in a program may actually impede system performance, rather than increasing system performance as desired. For example, worker threads, which carry out system operations, may fight with other threads/processes over operations to execute. This can lead to one or more worker threads' partial or full starvation and consequently system contention buildup. While non-blocking algorithms, such as lock-free and wait-free structures, may be used to improve system performance, they do not completely eliminate the aforementioned issues. Therefore, it is desirable to have a concurrent data structure that provides system wide progress guarantees while minimizing system contention.

A conventional approach to multi-threaded programming is to use locks in order to ensure that certain sections of code do not execute concurrently. In these situations, if a worker thread attempts to acquire a lock that is acquired by some other worker thread, the previously engaged thread will block the job-seeker thread until the lock is free. However, blocking a thread is undesirable for many reasons. For instance, when a thread is blocked, it cannot accomplish anything. If the blocked thread had been performing a high-priority or real-time task, it would be undesirable to halt its progress. Additionally, using locks also involves a trade-off between coarse-grained locking, which can significantly reduce opportunities for parallelism and fine-grained locking, which requires more careful design, increases locking overhead, and is more prone to bugs and deadlocks causing complete halt of the system.

Unlike blocking algorithms, non-blocking algorithms, e.g., lock-free data structures and wait-free data structures, do not suffer from these downsides and can be used to improve performance and to provide stronger progress guarantees. However, even these algorithms contain issues that impede system progress in case of lock-free algorithms and system performance in case of wait-free algorithms. While lock-free algorithms guarantee system-wide progress, they allow individual threads to starve, e.g., when multiple threads arrive at a single job simultaneously. Starvation is especially apparent when bytes in a data structure are scattered across a multitude of memory nodes, e.g., in a Non-Uniform Memory Access (NUMA) machine. In NUMA machines, memory access depends on the memory location relative to the processor. Therefore, a processor may access its own local memory faster than non-local memory. Because certain bytes in a scattered data structure are located closer to different threads than others are, the closer threads attain unfairly easy access to the data structure, which can lead to a starvation of individual workers which do not have easy access to the data structure. Although wait-free models ensure starvation freedom for every thread in the system by augmenting the lock-free design with a helping mechanism, that increases the algorithmic complexity. Additionally, the helping between threads introduces additional contention, which slows system performance.

Accordingly, an embodiment provides a method of executing a process request that ensures wait-free progress guarantees while reducing worker thread contention. In an embodiment, a dedicated helper thread performs operations on behalf of all worker threads. This allows the worker threads to cooperate rather than contend with each other, which consequently reduces contention and overall cache invalidation traffic. In an embodiment, one or more worker threads collect process requests and place those collected requests at a predetermined position on a state array. Each position in the state array is assigned to a particular worker thread. Thus, for each process request that a particular worker thread collects, that worker thread will place the process request in the position assigned to that worker. In an embodiment, the dedicated helper thread then executes the process requests placed within the state array.

In an embodiment, a fallback mechanism to ensure wait-freedom is provided. In an embodiment, if the dedicated helper thread does not execute the operation request within a predetermined time threshold, (e.g., 10 ms, 5 ms, 20 ms, etc.), the worker thread that collected the process request may execute the operation associated with that request. The worker thread, after executing the operation associated with the process request, may help other worker threads execute their tasks, which may lead back to thread contention. Thus, when the worker thread takes back the process request from the state array, the worker thread reports to the system that the dedicated helper thread has died. In an embodiment, when a predetermined number of worker threads (e.g., a majority, a predetermined number, a threshold, etc.) wait the predetermined time threshold for the dedicated helper thread to execute the operation and subsequently report that the helper thread has died, the helper thread is restarted (a new dedicated helper thread is started in place of the old helper thread). This fallback mechanism ensures that the possible thread contention that may have been created by the worker threads performing operations is only for a short period of time. The fallback mechanism also ensures that every process request will be completed within a finite number of steps.

Such a system provides a technical improvement over current systems for executing numerous process requests on a concurrent data structure. Using a dedicated helper thread reduces or eliminates worker thread starvation and thread contention. The use of a dedicated helper thread also provides a system that may execute processes across multiple processing units in a way that leverages the parallelism provided by the multicore architectures. Additionally, the system and methods as described herein provide a helper thread and fallback mechanism that, together, ensure that every operation will be completed in a finite number of steps. In an embodiment, the fallback mechanism ensures that system progress is not halted when the threads report that the dedicated helper thread has died. Additionally, in an embodiment, such a system ensures that system contention does not aggregate by providing a restart mechanism. The restart mechanism provides that a new dedicated helper thread is started in place of the old dedicated helper thread when the worker threads associated with the state array reach a consensus that the original dedicated helper thread has died or scheduled out.

Figure 1:
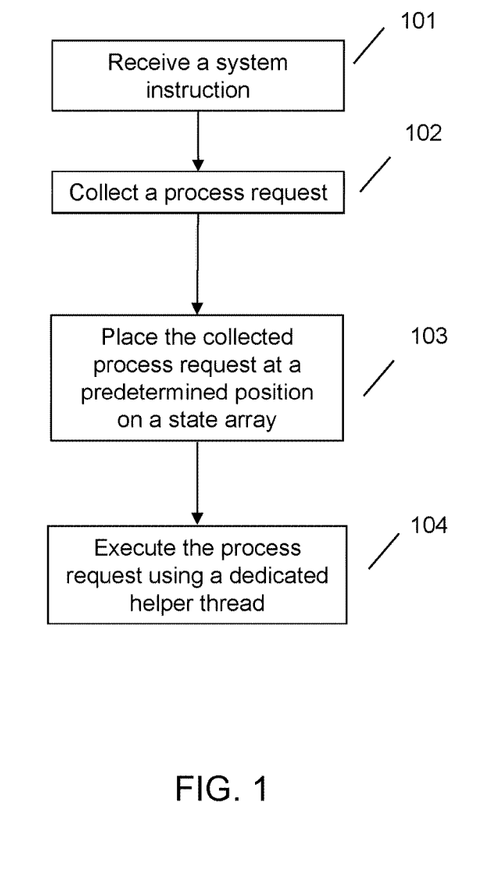
FIG. 1 illustrates a method of executing a process request using a dedicated helper thread.

Referring now to FIG. 1, an embodiment may execute a process request using a dedicated helper thread. At 101, an embodiment may receive a system instruction to perform an operation on a data structure. An example system instruction may include performing a mathematical operation on a dataset. In an embodiment, the system instruction may originate from at least one processor, for example, one processor in a multicore processing system, and the like. At 102, a worker thread may collect a process request associated with the system instruction. A single processing system can include many worker threads. A worker thread is created to perform tasks or operations within a computer system. For example, a worker thread may be created to perform operations on a particular data structure. In the context of embodiments as described herein, a worker thread may be created to collect process requests. An example process request may include "enqueue," which inserts a data object into a queue. Another example process request may include "pop," which removes a data object from a stack. Each of the process requests may serve to assist in performing the entire system instruction. In other words, each process request may be a single operation that needs to be completed in order to execute the system instruction.

At 103, the worker thread(s) may place the collected process request(s) at predetermined positions on a state array. In an embodiment, the size of the state array may be proportional to the number of worker threads in the system. For example, if the system includes fifty worker threads, the state array may include fifty positions. In an embodiment, the size of the state array may be independent from the number of worker threads in the system. For example, the system may include twenty-five worker threads, but the state array may include one hundred positions. This could be done to avoid false sharing in a multicore system.

Each position may be assigned to a predetermined worker thread. Each position may only be assigned to a single worker thread. For example, position 6 of 7 on the state array may be assigned to worker thread 6, while position 3 of 7 may be assigned to worker thread 3. When a worker thread places the process request on the state array, the worker thread may place the request at the position that is assigned to the worker thread. Using the example above, worker thread 6 would place collected process requests at position 6 of the state array. Worker thread 3 would place collected process requests at position 3 of the state array. In one embodiment, a worker thread that has placed a process request onto its predetermined position of the state array is prevented from collecting other process requests until its previous request is completed.

At 104, an embodiment may execute the process request. In an embodiment, a helper thread is provided. The helper thread may be independent from the worker threads. This independence means that the helper thread does not collect process requests. Rather, the helper thread only executes process requests that have been placed within a state array. The helper thread is dedicated to the state array and executes process requests that are placed within the state array. For example, the helper thread, rather than the worker thread, would execute the process requests once the request is placed in the state array. In an embodiment, the execution of the process requests by the dedicated helper thread may be executed in a predetermined manner. For example, the dedicated helper thread may execute process requests that were placed within the state array first (e.g., process requests that have been waiting for a longer period of time, etc.) before executing process requests that were place within the state array more recently (e.g., process requests that have been waiting within the state array for a shorter period of time, etc.). In other words, in one embodiment, the helper thread may execute process requests using a first-in-first-out technique.

As another example the dedicated helper thread may execute process requests based on the chronological order of the predetermined position within the state array (e.g., position 4 will be executed before position 5, which will be executed before position 6, etc.). In such an embodiment, the helper thread may access every position within the state array to determine if a process request has been placed in the state array. For example, the helper thread may access position 1 to identify if a process requests exists at position 1. If a process request is located at position 1, the helper thread may execute the process request. If no process request is located at position 1 or after executing the process request at position 1, the helper thread may access position 2 to determine if a process request exists at position 2. This type of access and execution may occur throughout the entire state array. Once the helper thread accesses the last position of the state array and either determines no process request is located at the last position or executes the process located at the last position, the helper thread may loop back to the first position in the state array and continue the process at the first position. In an embodiment, after the dedicated helper thread has executed the operation associated with a worker thread's collected process request, the worker thread is thereafter free to collect other process requests.

In some cases, the helper thread may die (e.g., no longer be able to process requests, get stuck while processing a request, errored while processing a request, etc.) or may schedule out (e.g., take too long to complete a request, cannot complete requests, etc.). Accordingly, referring now to FIG. 2, an embodiment may provide a mechanism by which a worker thread falls back to a traditional wait-free design to ensure that process requests will be completed within a finite number of steps. At 201, an embodiment may determine that the process request was not executed by the helper thread within a predefined time threshold. The predefined threshold may be preprogrammed into the system or may be chosen by a user or programmer of the system. For example, if the dedicated helper thread does not execute the operation associated with a process request within a predefined time threshold (e.g., 10 ms, 20 ms, 1 s, etc.), the system may fall back to a traditional wait-free design.

Figure 2:
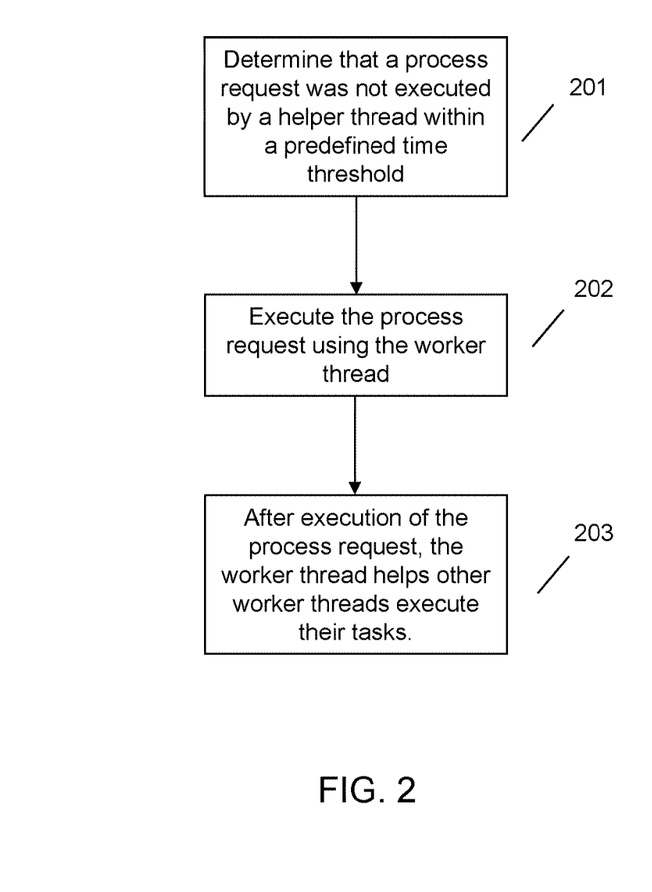
FIG. 2 illustrates a method of reverting at least one worker thread to a traditional wait-free design.

The determination that the process request was not completed within the predefined threshold may be made by the worker thread that placed the process request on the state array. For example, while the worker thread is waiting for the process request to be executed, the worker thread may keep track of how long it has been waiting. Once the waiting time has met or exceeded the predetermined time threshold, the worker thread may take further action as described in more detail below. As an alternative, the state array may have a timer associated with each position of the state array. Once a process request is placed within the state array, the time for that position may start. Once the timer reaches the threshold, the system may notify the respective worker thread that the process request has not been completed within the prescribed time frame.

When the process request is not completed within the time threshold, the worker thread that collected the process request and placed it within the state array may execute the operation associated with that request at 202. Additionally, because the process request associated with the worker thread was not completed within the predefined time threshold, the worker thread may assume the dedicated helper thread is scheduled out or has died. The worker thread may report this assumption to the system. In other words, the worker thread may report that the helper thread has died to the system. In an embodiment, in case the assumption of the worker thread was wrong, i.e., that the dedicated helper thread has not died, then both the worker thread and the dedicated helper thread may both try to execute the task. However, embodiments as described herein ensure that the operation is executed exactly once.

In the case that the worker thread has assumed that the helper thread has died, the worker thread can no longer rely on the helper thread to execute its process request and instead tries to execute the same on its own. Additionally, once the worker thread has executed the operation associated with the collected process request that the worker thread had previously placed in the state array, the worker thread may help other threads in a similar situation execute their tasks at 203. Thus, the worker threads that believe that the helper thread has died or scheduled out behave as they would in a traditional wait-free design, which may lead back contention.

Figure 3:
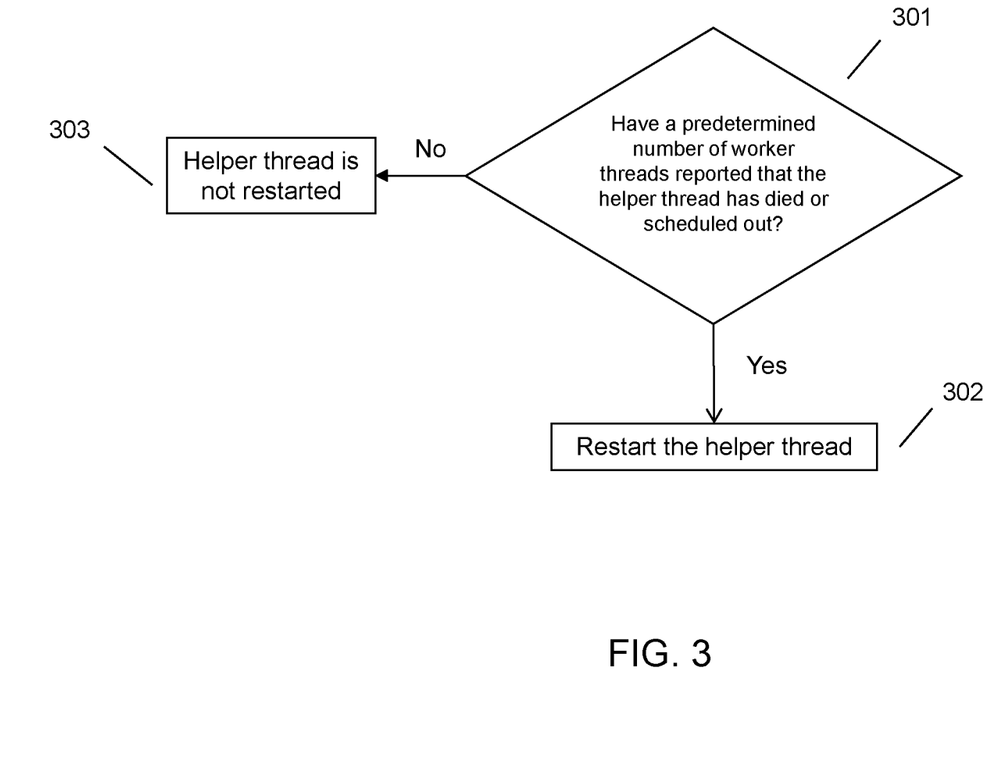
FIG. 3 illustrates a method of restarting of the helper thread.

Accordingly, an embodiment may provide a mechanism for restarting the helper thread. In an embodiment, a new dedicated helper thread is started when the original dedicated helper thread is assumed to have died or scheduled out. Referring now to FIG. 3, at 301, an embodiment may determine that a predetermined number of worker threads associated with the state array have reported to the system that the helper thread has died or scheduled out. In other words, the system may identify when a predetermined number of worker threads have identified that they have waited for a predefined time threshold for the dedicated helper thread to execute the operation associated with their collected process request and the helper thread has not completed the process request in the predetermined time threshold. In an embodiment, the predetermined number of worker threads may be a default or set by a user. For example, the predetermined number of worker threads may be a number equivalent to a majority of the worker threads associated with the state array. As another example, the predetermine number of threads may include a particular number.

If the system determines that no worker threads, or a number of worker threads less than the predetermined number of worker threads, have reported that the dedicated helper thread has died or scheduled out, an embodiment may take no action (e.g., not restart the helper thread, etc.) at 303. If, however, the system determines that a predetermined numbers of worker threads have reported that the dedicated helper thread has died or scheduled out (e.g., did not execute the operation associated with their process request in a predefined time threshold, etc.), an embodiment may restart the helper thread at 302. This checking mechanism may ensure that the helper thread is not restarted too often, which may cause process requests to take too long to execute. More particularly, the checking mechanism ensures that the helper thread is not restarted for minor delays. Rather, helper thread restarts will only occur for situations corresponding to a probable error with the dedicated helper thread, e.g., where the dedicated helper thread has died or scheduled out.

The helper thread restart mechanism effectively minimizes the amount of system contention that may arise and also ensures that the fallback period to the traditional wait-free design is very short and does not have a high impact on overall performance.

Figure 4:
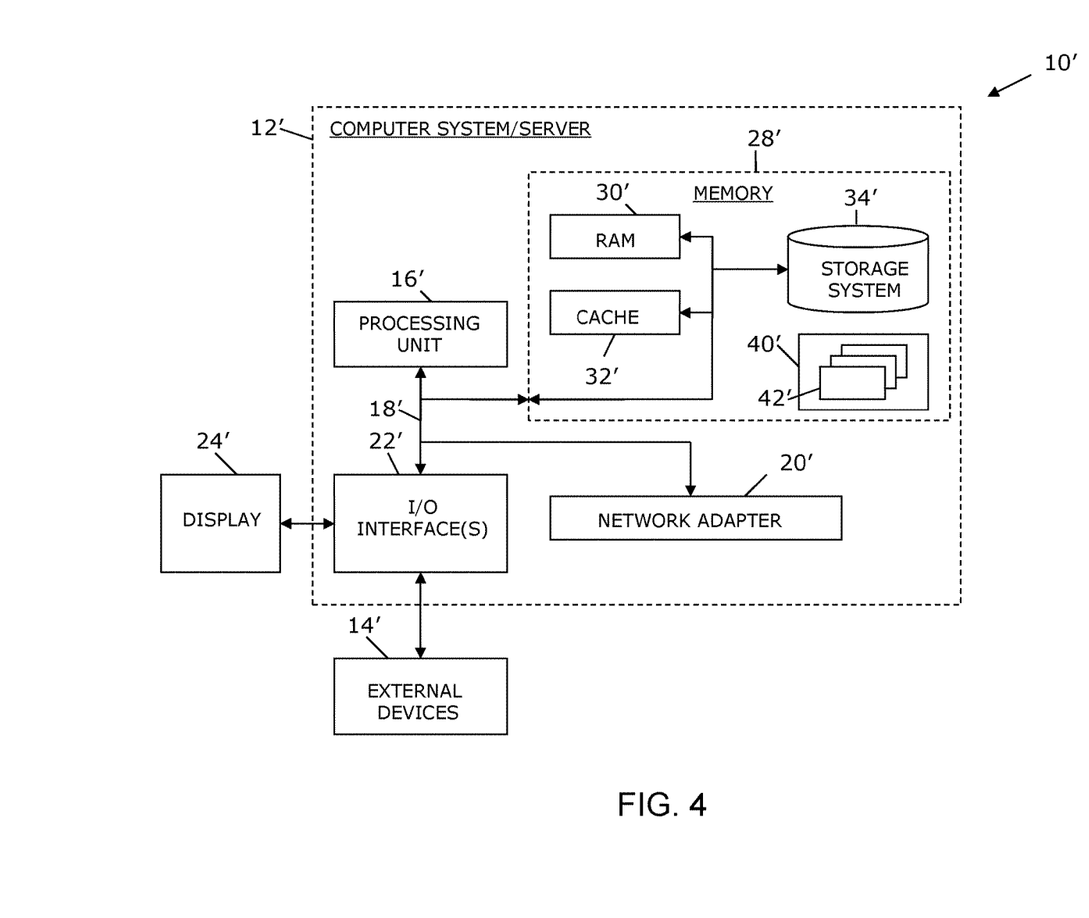
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   utilizing at least one processor to execute computer code that performs the steps of:
   receiving a system instruction from the at least one processor to perform an operation on a data structure;
   collecting, using at least one worker thread from a plurality of worker threads, a process request associated with the system instruction, wherein the plurality of worker threads perform operations within a computer system;
   placing the collected process request at a predetermined position on a state array, wherein the predetermined position is assigned to the at least one worker thread and wherein a helper thread is dedicated to the state array to execute requests placed within the state array;
   executing the process request; and
   determining that the process request was not executed by the helper thread within a predetermined time threshold;
   wherein the executing comprises executing the process request using the at least one worker thread if the helper thread does not execute the process request within the predefined time threshold.

2. The method of claim 1, wherein the at least one worker thread, upon executing the process request, helps other worker threads whose process request was not executed by the helper thread within the predetermined time threshold to execute their process request.

3. The method of claim 1, comprising determining that a predetermined number of the at least one worker threads in the state array have waited a predefined time threshold for the helper thread to execute their process request.

4. The method of claim 3, comprising restarting, based on the determining, the helper thread, wherein the restarting comprises activating a new helper thread to execute process requests.

5. The method of claim 1, wherein the operation of the helper thread is independent from the operations of the worker threads.

6. The method of claim 1, wherein the placing comprises preventing the at least one worker thread from placing a new process request until the collected process request is executed.

7. The method of claim 6, comprising releasing the at least one worker thread to collect another process request when the process request that the at least one worker thread placed on the state array is executed by the helper thread.

8. The method of claim 1, wherein the executing comprises executing each process request only once.

9. An apparatus, comprising:
   at least one processor; and
   a computer readable storage medium having computer readable program code embodied therewith and executable by the at least one processor, the computer readable program code comprising:
   computer readable program code that receives a system instruction from the at least one processor to perform an operation on a data structure;
   computer readable program code that collects, using at least one worker thread from a plurality of worker threads, a process request associated with the system instruction, wherein the plurality of worker threads perform operations within a computer system;
   computer readable program code that places the collected process request at a predetermined position on a state array, wherein the predetermined position is assigned to the at least one worker thread and wherein a helper thread is dedicated to the state array to execute requests placed within the state array;
   computer readable program code that executes the process request; and
   computer readable program code that determines that the process request was not executed by the helper thread within a predetermined time threshold;

wherein the computer readable program code that executes comprises executing the process request using the at least one worker thread if the helper thread does not execute the process request within the predefined time threshold.

10. A computer program product, comprising:
a computer readable storage medium having computer readable program code embodied therewith, the computer readable program code executable by at least one processor and comprising:
computer readable program code that receives a system instruction from the at least one processor to perform an operation on a data structure;
computer readable program code that collects, using at least one worker thread from a plurality of worker threads, a process request associated with the system instruction, wherein the plurality of worker threads perform operations within a computer system;
computer readable program code that places the collected process request at a predetermined position on a state array, wherein the predetermined position is assigned to the at least one worker thread and wherein a helper thread is dedicated to the state array to execute requests placed within the state array;
computer readable program code that executes the process request; and
computer readable program code that determines that the process request was not executed by the helper thread within a predetermined time threshold;
wherein the computer readable program code that executes comprises executing the process request using the at least one worker thread if the helper thread does not execute the process request within the predefined time threshold.

11. The computer program product of claim 10, wherein the at least one worker thread, upon executing the process request, helps other worker threads whose process request was not executed by the helper thread within the predetermined time threshold to execute their process request.

12. The computer program product of claim 10, comprising determining that a predetermined number of the at least one worker threads in the state array have waited a predefined time threshold for the helper thread to execute their process request.

13. The computer program product of claim 12, comprising restarting, based on the determining, the helper thread, wherein the restarting comprises activating a new helper thread to execute process requests.

14. The computer program product of claim 10, wherein the placing comprises preventing the at least one worker thread from placing a new process request until the collected process request is executed.

15. The computer program product of claim 14, comprising releasing the at least one worker thread to collect another process request when the process request that the at least one worker thread placed on the state array is executed by the helper thread.

16. A method, comprising:
utilizing at least one processor to execute computer code that performs the steps of:
receiving a system instruction from the at least one processor, wherein the system instruction comprises a plurality of process requests for completing an operation on a data structure;
assigning, to each worker thread from a plurality of worker threads created to collect process requests, a position of a state array, wherein the state array has a dedicated helper thread that is assigned to execute process requests placed within the state array;
collecting, using one of the worker threads, at least one of the plurality of process requests and placing the process request at the position of the state array assigned to the one of the worker threads;
executing the process requests placed on the state array, wherein the process requests are executed by the dedicated helper thread while located on the state array; and
determining that the process request was not executed by the helper thread within a predetermined time threshold;
wherein the executing comprises executing the process request using the at least one worker thread if the helper thread does not execute the process request within the predefined time threshold.

* * * * *